United States Patent [19]

Lippits et al.

[11] 4,446,549
[45] May 1, 1984

[54] OPTICALLY READABLE INFORMATION DISC AND METHOD OF MANUFACTURING SAME

[75] Inventors: Gerardus J. M. Lippits; Johan G. Kloosterboer; Godefridus Melis, all of Eindhoven, Netherlands

[73] Assignee: U.S. Philips Corporation, New York, N.Y.

[21] Appl. No.: 307,131

[22] Filed: Sep. 30, 1981

[30] Foreign Application Priority Data

Mar. 27, 1981 [NL] Netherlands ............... 8101515

[51] Int. Cl.³ ................ B32B 15/08; G11B 7/24
[52] U.S. Cl. ......................... 369/275; 369/284; 369/286; 369/288; 428/64
[58] Field of Search ............ 369/275, 284, 286, 288; 428/64

[56] References Cited

U.S. PATENT DOCUMENTS 4,272,574  6/1981  Lippitts et al. ............ 428/64
4,275,091  6/1981  Lippitts et al. ............ 427/53.1
4,389,719  6/1983  Van de Donk et al. ........ 428/64

FOREIGN PATENT DOCUMENTS 1579709  11/1980  United Kingdom .

Primary Examiner—William R. Dixon, Jr.
Attorney, Agent, or Firm—Norman N. Spain

[57] ABSTRACT

An optically readable information disc having a substrate plate which on at least one side comprises an information layer of a lacquer cured by irradiation for example by ultraviolet light, said layer carrying an optically readable information track in which the lacquer is a monocomponent lacquer which, in addition to 0.1-5% by weight of auxiliary substances, comprises only one radiation cross-linkable compound in a quantity by weight from 95-99.9% selected from the group consisting of alkanedioldiacrylates, alkanedioldimethacrylates, alkeneglycoldiacrylates and alkeneglycoldimethacrylates having the acrylate or methacrylate groups in end position, of which the alkane moiety and alkene moiety comprise from 4 to 12 carbon atoms, and in which the cured lacquer apart from the auxiliary substances comprises no or substantially no extractable material.

3 Claims, 4 Drawing Figures

OPTICALLY READABLE INFORMATION DISC AND METHOD OF MANUFACTURING SAME

BACKGROUND OF THE INVENTION

The invention relates to an optically readable information disc comprising a substrate plate on one side of which there is present an information layer formed from a radiation cured lacquer. The information layer comprises an optically readable information track having information areas situated alternately at a higher and at a lower level along the track.

Such an information disc is known from Netherlands Patent Application No. 7.611.395 filed in the name of Applicants and corresponding to U.S. Pat. No. 4,275,091 issued June 23, 1981.

In the manufacture of this known disc, lacquers comprising mixtures of various acrylic acid esters (acrylates) are used. These multicomponent lacquers notably comprise a large quantity (60-90% by weight) of a monoacrylate in combination with 8-20% by weight of a diacrylate, triacrylate or tetraacrylate. In particular the combination of a large quantity of a monoacrylate with approximately 20% by weight of a diacrylate and/or a triacrylate is frequently employed. In Netherlands Patent Application No. 7.803.069 corresponding to U.S. patent application Ser. No. 006,609, filed Jan. 26, 1979 which relates to multilayer information discs, radiation curable lacquers, particularly ultraviolet light-curable lacquers are disclosed which comprise 50-80% by weight of a monoacrylate, 5-40% by weight of a di-, tri- or tetraacrylate, as well as 1-3% by weight of an initiator. In the examples of the last mentioned Netherlands Patent Application a multicomponent lacquer is described which comprises 78% by weight of 2-ethylhexylacrylate, 20% by weight of 1,1,1-trimethylolpropane-triacrylate and 2% by weight of benzoinisobutylether (initiator).

The use of multicomponent lacquers is feasible, because the lacquers have to satisfy a great number of often contradictory requirements. A person skilled in the art will endeavour to reach the desired diversity in lacquer properties by mixing various components lack of which have different physical and chemical properties and try to find a suitable compromise between the contradictory requirements.

As a result there exists a clear tendency towards the use of even more complicated multicomponent lacquers in applications having an extensive pattern of requirements.

In this connection it is to be noted that radiation-curable lacquers when used in information discs have to satisfy an extensive set of requirements. These include for example:
 1. low viscosity, so that small layer thicknesses can be since the use of larger layer thickensses the shrinkage may give rise to deformation of the underlying substrate.
 2. rapid and good curing;
 3. good adhesion to the substrate plate;
 4. no adhesion to the metal matrix surface which is used in manufacturing the information disc;
 5. suitability for provision, after curing, with a reflective layer, for example a layer of silver or aluminum;
 6. optically transparently;
 7. after curing, non-deformability and chemically stability under varying climatological conditions.

SUMMARY OF THE INVENTION

Applicants have broken through the lacking of the prior art that a complicated multicomponent lacquer should be employed because of complicated requirements for lacquers for the discs and have unexpectedly found that all these requirements may be satisfactorily met by a lacquer of much simplier composition.

According to the invention there is provided an information disc of the type mentioned in the opening paragraph which is characterized in that, in addition to the usual auxiliary substances present in a quantity by weight from 0.1 to 5%, the lacquer comprises a single radiation cross-linkable monomeric compound in a quantity by weight from 95-99.9% selected from the group consisting of alkanedioldiacrylates, alkanedioldimethacrylates, alkeneglycoldiacrylates and alkeneglycoldimethacrylates. In these monomers the acrylate or methacrylate are in end positions, the alkane and alkene moieties comprise 4-12 carbon atoms. The resultant cured lacquer apart from the auxiliary substances comprises no or substantially no extractable material.

The use of the monocomponent lacquer in the disc according to the invention not only results in melting all of the the above-mentioned requirements but it also has significant advantages over the known use of multicomponent lacquer systems.

An advantage which is of clearly practical importance particularly for the production of large series of information discs, is that, due to the simplicity of the lacquer compositions very pure lacquers can be obtained as a result of which information discs of excellent quality can be achieved in a reproducible manner. Small contaminations which cannot be avoided in multicomponent lacquers often have a disastrous influence on the reproducibility of the manufacturing process and of the desired quality of the discs. Furthermore in multicomponent lacquers quite a lot of isomers of the components are formed or are present. As a result of which the reproducibility of the process procedure and hence the quality of the resulting discs is adversely influenced. Experiments have demonstrated that the quality of the known information discs deteriorates in the course of time. Applicants have found that this deterioration in quality also results from the cured multicomponent lacquer layer and have established in particular that even after a very long curing time (with U.V. light curing), the cured multicomponent lacquers used in the known discs comprise constituents which are sufficiently mobile to diffuse towards the surface of the cured lacquer layer. As a result of this the shape and hence the quality of the information track is adversely influenced in the long run. Such mobile components furthermore attack the reflective layer of, for example, vapour-deposited silver provided on the lacquer layer and reduce the adhesion of the reflective layer to the lacquer layer.

These problems are avoided with the optically readable information disc according to the invention since an essential advantage of the discs of the invention is that substantially no extractable matter is present in the cured lacquer in the discs.

The auxiliary substances used in the lacquer of the mixtures are, for example, photosensitive initiators in a quantity by weight from 0.1 to 5%, stabilizers in a quantity by weight from 0.01-0.05% and accelerators in a quantity by weight from 0–3%. A suitable photosensitive initiator, which upon exposure to, for example, ultraviolet light, forms radicals which initiate the desired polymerization reaction is an aromatic carbonyl compound, for example, a benzoinisobutylether or a ketal, for example benzildimethylketal. A suitable stabilizer is the monomethylether of hydroquinone. An example of a useful accelerator is methyldiethanolamine.

Examples of readily useful acrylates or methacrylates used in the disc according to the invention and having acrylate groups or methacrylate groups in end position are:

1,6-hexanedioldiacrylate; 1,6-hexanedioldimethacrylate, 1,7-heptanedioldiacrylate; 1,7-heptanedioldimethacrylate; 1,8-octanedioldiacrylate; 1,8-octanedioldimethacrylate; 1,10-decanedioldiacrylate; 1,10-decanedioldimethacrylate; di-, tri- and tetraethyleneglycoldiacrylate and di-, tri- and tetraethyleneglycoldimethacrylate.

In a favourable embodiment of the information disc and lacquer comprises from 95–99.9% by weight of an alkanedioldiacrylate and alkane moiety of which comprises 6–10 carbon atoms. This applies in particular to a lacquer which comprises at least 96% by weight of 1,6-hexanedioldiacrylate and for the remainder one or more auxiliary substances.

The invention furthermore relates to a method of manufacturing the information discs described above in which a layer of the described lacquer having a small layer thickness is provided between the surface of a transparent substrate and the surface of a matrix carrying an optically readable information track. The lacquer is cured at ambient temperature or at elevated temperature by irradiation through the transparent substrate. The substrate and the cured lacquer layer which adheres to the substrate and in which the information track is copied, is removed from the matrix surface and the lacquer layer is post-cured by irradiation at an elevated temperature in case the first curing has taken place at ambient temperature.

It is to be noted that a process of this type generally is known from the above-mentioned Netherlands Patent Application No. 7.611.395. The special aspect of the method according to the invention is that the lacquer is cured either at elevated temperature on the matrix while being exposed to radiation, for example, ultraviolet light and/or is post-cured at elevated temperature. Curing on the matrix at elevated temperature is to be preferred. It has been found that the extent of curing, or in other words the number of cross-links, is influenced by the temperature. By a suitable choice of the temperature level an optimum degree of polymerization can be realized. Good results are obtained with a temperature range from 30°–120° C., in particular 30°–90° C., for example 40°–50° C. The layer thickness preferably is not more than 10 $\mu$m.

DETAILED DESCRIPTION OF THE INVENTION

Figure 1:
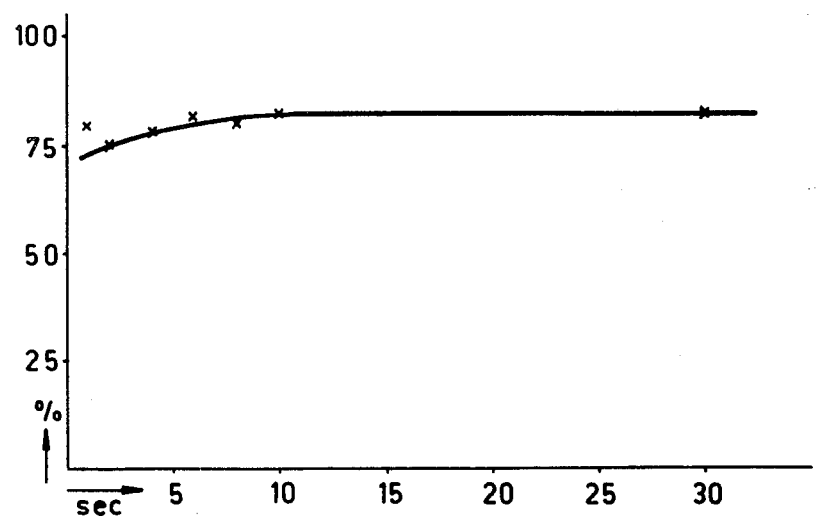
Figure 2:
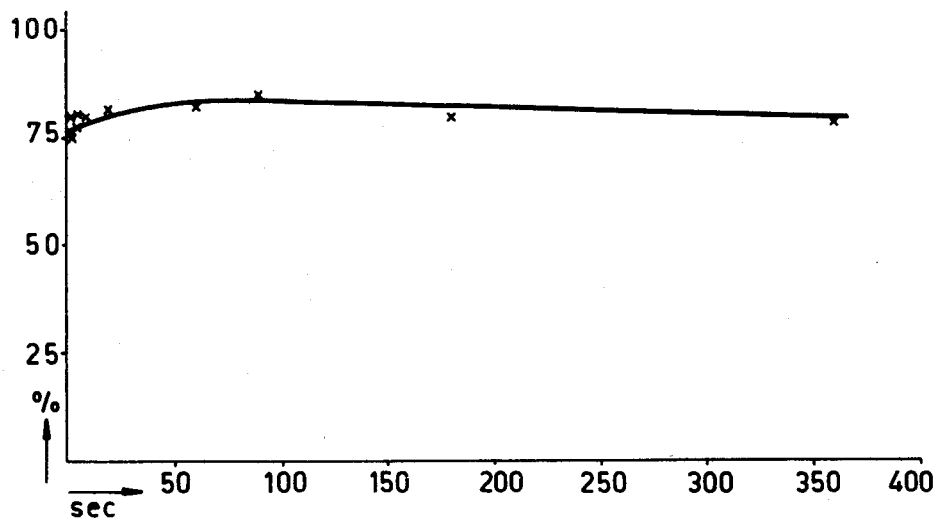
Figure 3:
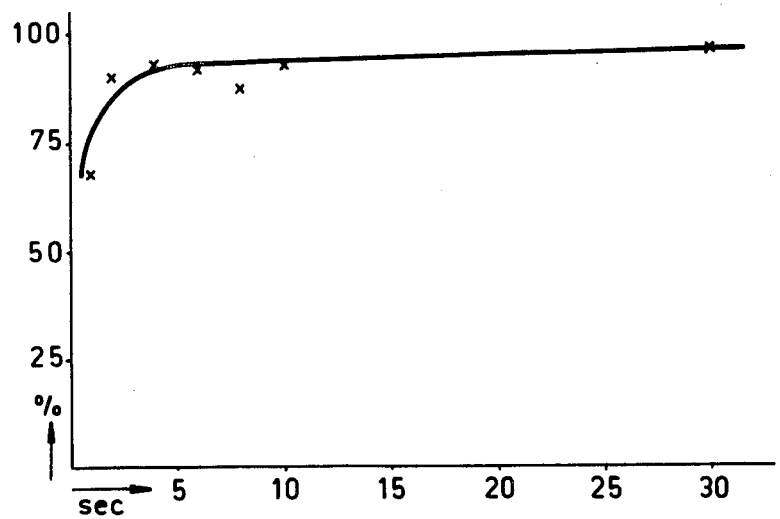
Figure 4:
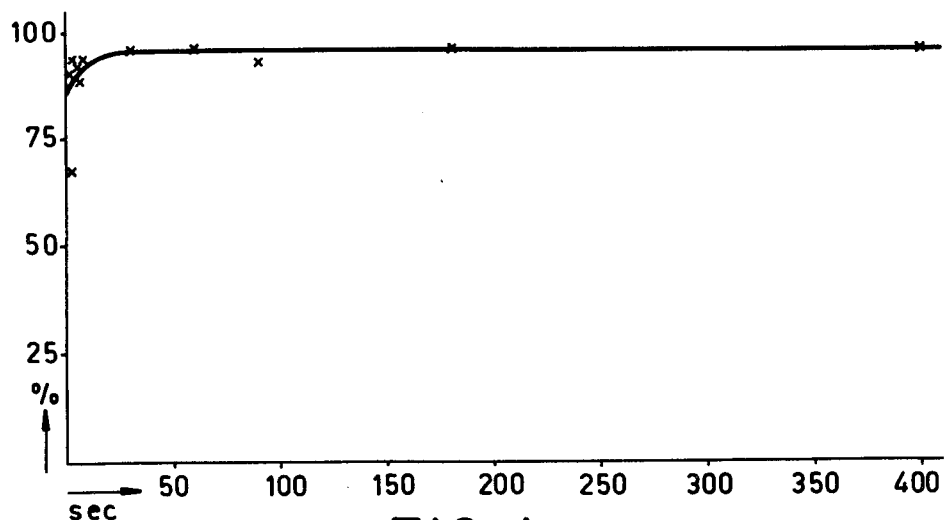

The invention will be described in greater detail by means of the example and with reference to the drawing, in which:

FIGS. 1 and 2 are graphs in which the exposure time of a lacquer used in a known information disc is plotted on the horizontal axis and the percentage of the residue of the lacquer after extraction with chloroform is plotted on the vertical axis, and FIGS. 3 and 4 are graphs showing the percentage of the residue of the lacquer material used in the disc according to the invention after extraction with chloroform as a function of the exposure time.

The data shown in FIGS. 1 to 4 have resulted from experiments in which a glass plate (Pyrex glass) having an area of 5×5 cm$^2$ was provided with a 10 $\mu$m thick layer of an ultraviolet light-curable lacquer. The data recorded in FIGS. 1 and 2 relate to a known multicomponent lacquer for use in information discs and having the following composition:

58% by weight of tripopyleneglycoldiacrylate
28% by weight of N-vinylpyrrolidone
10% by weight of trimethylolpropanetriacrylate
4% by weight of benzildimethylketal.

The data recorded in FIGS. 3 and 4 relate to a monocomponent lacquer used in the disc according to the invention and comprising 96% by weight of 1,6-hexanedioldiacrylate and 4% by weight of benzildimethylketal.

The glass plate provided with the lacquer layer was exposed to ultraviolet light with an intensity of 10 mW/cm$^2$ on the layer. The exposure time in seconds of the various experiments is plotted on the horizontal in the graphs of FIGS. 1 to 4. The glass plate with the cured lacquer layers was immersed for 18 hours in chloroform and then dried to constant weight. The loss of weight as a result of the extraction with chloroform was determined. The weight of the residue was expressed in percent by weight of the original weight of the lacquer layer and recorded in the graphs of FIGS. 1 to 4 as a function of the exposure time. The results clearly indicate that the lacquer used in the disc according to the invention comprises no or substantially no extractable material even after an exposure time of any approximately 10 seconds (see FIG. 3) apart from the benzyldimethylketal (initiator). The known lacquer on the contrary shows, even at exposure times of hundreds of seconds (see FIG. 2), a considerable loss of weight in the order of magnitude from 15 to 20% by weight.

The information disc according to the invention may be manufactured as follows.

A quantity of 5 cm$^3$ of an ultraviolet light-curable lacquer is provided on the surface of a nickel matrix which is provided with an optically readable information track. The lacquer comprises 96% by weight of 1,6-hexanedioldiacrylate and 4% by weight of 2,2-dimethoxy-2-phenylacetophenone (benzildimethylketal). In the manner described in Netherlands Patent Application No. 7702,702 in the name of Applicants and corresponding to U.S. Pat. No. 4,312,823, issued Jan. 26, 1982 a substrate plate of polymethylmethacrylate having a diameter of 30 cm and a thickness of 1.2 mm is provided on the lacquer. For this purpose the substrate plate is slightly vaulted and pressed centrally on the lacquer deposit. The lacquer will spread with a circular liquid front over the surface of the matrix while simultaneously the vaulted substrate plate flattens. In the final position the substrate plate lies on the formed lacquer layer without internal stresses. The matrix together with lacquer layer and substrate plate is rotated at a rate of 2,000 rpm. The excess of lacquer is removed. The resulting thickness of the lacquer layer was 1.5 $\mu$m. The assembly is brought to a temperature of 80° C. and the lacquer layer is then exposed to ultraviolet light through the transparent substrate plate for a few seconds. The light intensity was 1.8 mW/cm$^2$ on the layer. After the exposure the resulting assembly of substrate plate and cured lacquer layer connected thereto is taken from the surface of the matrix and provided with a vapour-deposited layer of aluminium on the side of the lacquer layer.

What is claimed is:

1. An optically readable information disc comprising a substrate plate on at least one surface of which there is present an information layer of a radiation cured lacquer, said information layer comprising an optically readable information track having information areas situated alternately at a higher and a lower level along the track, characterized in that, in addition to the usual auxiliary substances in a quantity by weight from 0.1 to 5%, the lacquer comprises only a single radiation curable monomeric compound in a quantity by weight from 95-99.9% and selected from the group consisting of alkendioldiacrylates, alkanedioldimethacrylates, alkeneglycoldiacrylates and alkeneglycoldimethacrylates having the acrylate or methacrylate groups in the end positions and in which the alkane radical and alkene moieties are of 4-12 carbon atoms, and in which the cured lacquer apart from the auxiliary substances comprises no or substantially no extractable material.

2. An optically readable information disc as claimed in claim 1, characterized in that the lacquer comprises 95.99.9% by weight of an alkendioldiacrylate the alkane moiety of which comprises from 6 to 10 carbon atoms.

3. An optically readable information disc as claimed in claim 2, characterized in that the lacquer comprises at least 96% by weight of 1,6-hexanedioldiacrylate and for the remainder one or more auxiliary substances.

* * * * *

UNITED STATES PATENT AND TRADEMARK OFFICE
CERTIFICATE OF CORRECTION

PATENT NO. : 4,446,549
DATED : May 1, 1984
INVENTOR(S) : GERARDUS J.M. LIPPITS ET AL

It is certified that error appears in the above-identified patent and that said Letters Patent is hereby corrected as shown below:

On the title page,
(75) Inventors

"Godefridus Melis" should be --Godefridus P. Melis--.

Column 5, line 15

"alkendioldiaerylates" should be --alkanedioldiactylates--.

Column 6, line 9

"alkendioldiacrylate" should be --alkanedioldiacrylate--.

Signed and Sealed this

Twenty-eighth Day of August 1984

[SEAL]

Attest:

GERALD J. MOSSINGHOFF

Attesting Officer

Commissioner of Patents and Trademarks